Figure 1:
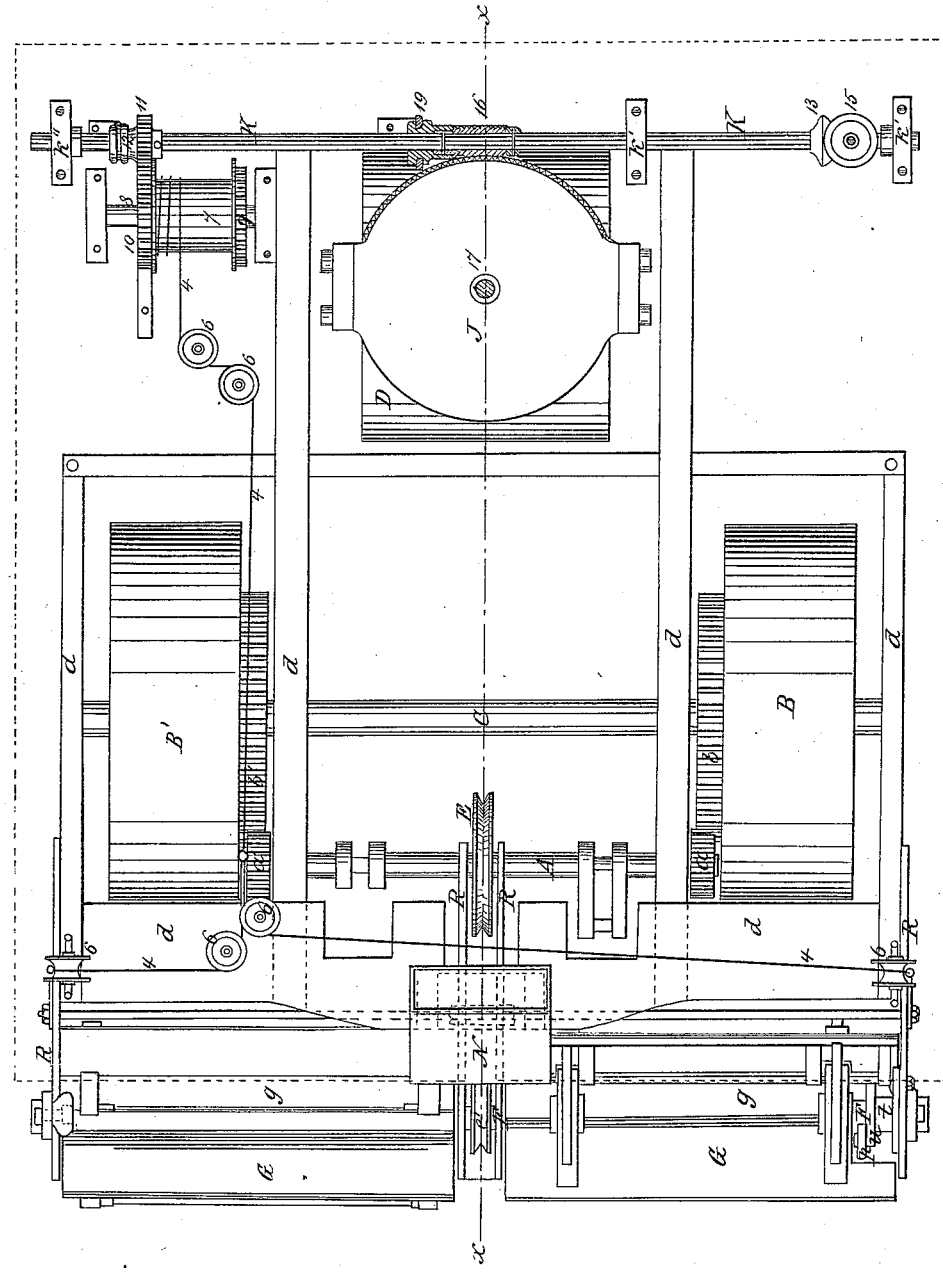

J. CURTIS.
Steam-Plow.

No. 44,077. Patented Sept. 6, 1864.

Witnesses:
Henry Baldwin
J. Snowden Bell

Inventor:
James Curtis

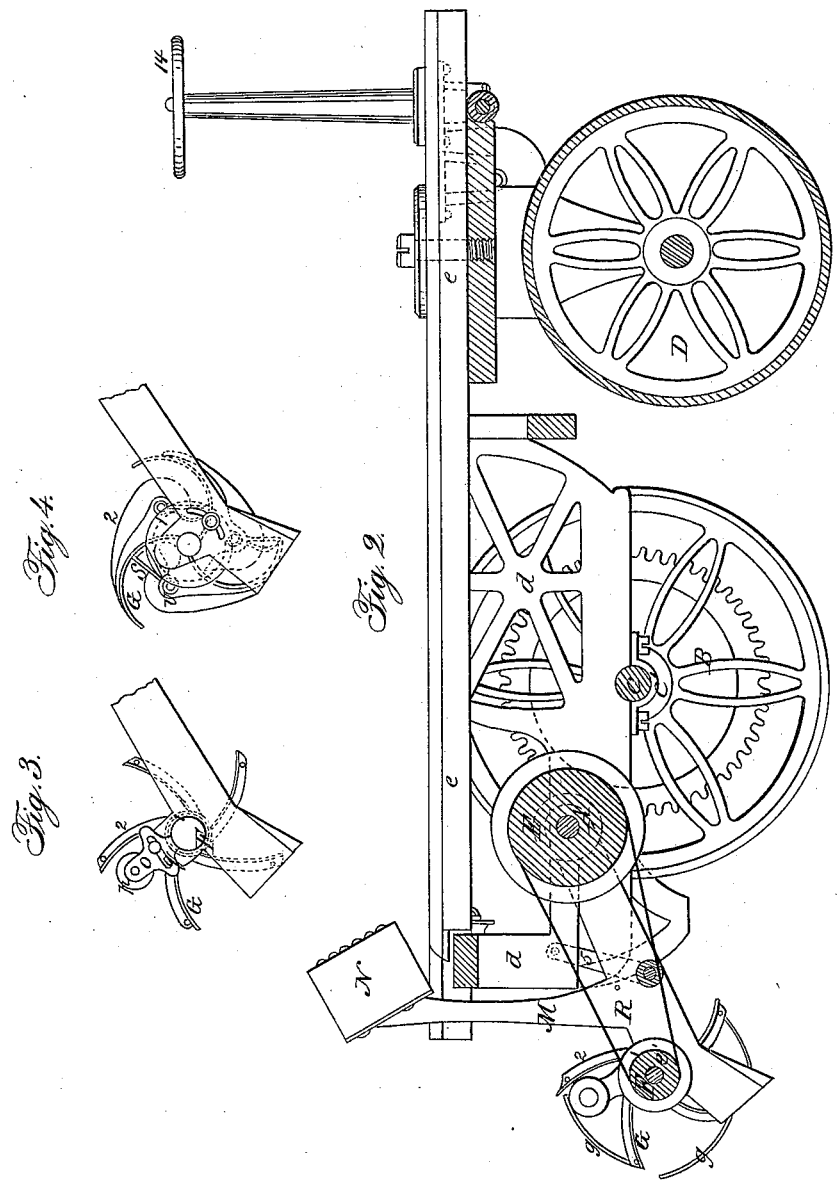

UNITED STATES PATENT OFFICE.

JAMES CURTIS, OF CHICAGO, ILLINOIS.

STEAM-PLOW.

Specification forming part of Letters Patent No. 44,077, dated September 6, 1864.

*To all whom it may concern:*

Be it known that I, JAMES CURTIS, of the city of Chicago, in the county of Cook and State of Illinois, have invented a new and useful Improvement in Steam-Plows; and I do hereby declare that the following is a full, clear, and exact description of the construction and operation of the same, reference being had to the annexed drawings, making a part of this specification, and in which—

Figure 1 is a plan view of my plow without the engine and bed. Fig. 2 is a vertical longitudinal section thereof at the line $x\,x$ of Fig. 1, and Figs. 3 and 4 are sectional views of the cutters and cleaners.

As heretofore constructed it has been found difficult, if not impossible, to render the steam-plow economically effective, owing to the heavy drag of a gang of colters and shares or the jarring and dragging action of diggers or shovels.

Now, it is the object of my invention to construct a steam-plow so that it shall operate a rotary cutter or cutters to cut a furrow with precision of equal depth throughout its whole length and pulverize the earth from the furrow by carrying it over the cutter, to render the cutters adjustable to any desired depth of furrow and cause them to always act under a uniform determined pressure, to cleanse the cutters and discharge the earth therefrom automatically and in reverse position, or top downward, and to guide the plow and regulate the depth of plowing from the same shaft, while both results are under the control of the conductor.

My invention consists, first, in the employment of cutters, of any desired width, fixed to a shaft rotating from the bottom of the cut to the surface of the ground, and carrying the earth over with them and delivering it pulverized back to the furrow behind the cutters; second, in the employment of cleaners for the cutters that shall automatically strip the earth from them at any desired point in their rotation with its surface reversed; third, in the employment of adjustable rollers, in combination with stationary cams, to control and time the motions of the cleaners over the surface of the cutters to remove the earth therefrom at the point desired; fourth, in suspending the rotating cutter-shaft in arms constantly acting under a fixed pressure, but always adjustable to any depth of furrow; fifth, in the employment of a weight or spring, in combination with the adjustable arms, so that when the cutters are thrown out of the furrow by a rigid obstruction they shall not be injured and shall directly return to the original depth of cutting or furrow; sixth, in the employment of a single shaft to operate the chains by which the adjustable arms are suspended and steer or guide the machine, and arranging the same so as to be always under the control of the conductor.

My plow receives its motion from the steam-engine through a pitman-connection with the crank-shaft A, and this shaft imparts motion to the carrying-wheels B and B' through the pinions $a$ and $a'$ gearing, with the cog-wheels $b$ and $b'$ on the main shaft or axle C.

The engine and boiler are not shown in the drawings; but they rest upon the axle C and a pivoted wheel, D, which also serves to control the line of movement of the machine.

A skeleton-frame, $d\,d\,d$, of suitable length, is supported by proper boxes, C', on the outer ends of the main shaft C, and sustains the platform $e\,e$ on its top and furnishes proper bearings beneath the platform for the journals of the crank-shaft A.

The crank-shaft A carries a driving-pulley or chain-wheel, E, which imparts motion to the pulley or chain-wheel $e'$ and cutter-shaft F through the belt or chain shown in red lines in Figs. 1 and 2. The shaft F carries the cutters G and their cleaners $g$, while the guides and rollers for moving the cleaners over the concave surface of the cutters to strip them are attached to the outer arms, which support the outer ends of the cutter-shaft.

The cutters may be adapted to cut a furrow of any desired width less than half the length of the cutter-shaft. In the drawings they are shown as of nearly the half-width of the machine.

Two or more hubs, 1, Fig. 2, with curved arms 2, are so fastened on the cutter-shaft F, that when the steel cutters are fastened to the arms their edges will be parallel with the shaft, and the cutters may be two, three, or more in number, and of such a curvature as to cut the earth in the direction of the forward movement of the plow, carry the earth cut upward from the bottom of the furrow toward the surface around and over the shaft, and discharge it in a reversed position behind the cutters. These curved cutter plates or blades may be riveted or otherwise securely fastened to the concave sides of the arms 2, and the cleaners $g$ may be hinged to the back or convex sides of the arms 2, or to a rod passing through the arms at a point that will cause the outer edges of the cleaners to describe the arc of the concave curvature of the cutters; or, in other words, each cleaner must be hinged in front of the cutter it is to clean, and must be made of such a width as will constitute the radius necessary to describe a circle of which the cutter is an arc.

To make the cleaners vibrate on their hinges at the proper time and for the right distance to discharge the earth from the cutters at the point desired, a guide-bracket, $o$, with a slot, $q$, Figs. 3 and 4, and friction-roller $p$ is attached securely by a pin or screw to the outside of the arms R, that sustain the cutter-shaft F. This guide-bracket is fastened by a set-screw through the slot $q$, and the slot renders the position of the friction-roller adjustable to vary the vibration of the cleaners. The friction-roller, being stationary, is placed within the circle of rotation of the cleaners, and as the outer ends of the cleaners in their rotation ride over the rollers $p$ the cleaners are necessarily and gradually forced from their normal position against the shaft outward until their edges have passed over the entire concave surface of the cutters, and forced away the earth from them, and at this point the edge of the cleaner will have passed the friction-roller, and fall gradually back into its normal position, for a shoulder, $v$, at its corner will prevent it falling out of place. When the cleaners are desired to have a wider movement, or their edges are required to describe a larger arc than can conveniently be given by the roller $p$, a cam, $s$, placed on the back of the cleaners will secure the length of movement desired, for the cam will be so placed as to pass over the friction-roller instead of the face of the scraper.

When desired, a sleeve, $t$, may be made to surround the shaft F, and be secured to the inside of the supporting-arm. This sleeve may terminate in a flange, $u$, that may itself be an eccentric; or it may carry a slot, in which the roller $p$ in Fig. 1 may be made adjustable by a set-screw, and this is an equivalent of the arrangement of the cam on the cleaner and friction-roller that may under some conditions of operation become advantageous.

The cutter-shaft F is supported in arms R R R, and these are so placed as to give support to each end of each set of cutters, although the shaft F is continuous for the whole width of the plow. The outer arms R are pivoted to the outside of the frame in line with the crank-shaft, while those that give intermediate support to the shaft F may vibrate on the crank-shaft to which they can be secured by straps or bearings or to the frame of the machine. The outer arms R R are for the depth that they enter the ground beveled from out to in—that is, they are brought to an edge which is outside, and therefore tend to throw the earth inward into the cutters. The two arms in the center are apart only sufficiently to allow the motion of the pulley or chain-wheel $e'$, and are joined together outside of the wheel $e'$ by a piece of the form of a double mold-board, thus throwing the earth to the right and left into the cutters, and clearing the way for the wheel $e'$.

The intermediate arms R sustain a standard, M, that carries a weight-box, N, and thus by varying the weight in the box N any required pressure upon the cutters can be rendered constant to always keep the cutters in operation beneath the ground at a fixed depth to secure a uniform depth of furrow. The same result may be attained by the introduction of a spring and set-screw, by which the pressure required may be received on the standard and imparted to the cutters, and either device will be equally adjustable, and thus an effective protection is secured against injury to the cutters by the presence of rigid obstructions in the furrow, for when the cutters strike such the weight or spring will yield to the unusual resistance to the onward action of the cutters, permit the shaft F to rise, and pass the cutters over the obstruction, when the weight or spring, resuming its determined pressure, will cause the cutters quickly to resume a cut to the full depth of the furrow.

To so control the cutters as to make the furrow of a uniform depth throughout its whole length, the arms R R R, and consequently the cutter-shaft, are suspended to chains or cords 4, that are connected to straps 5, fastened to the arms at one end, carried over suitably-placed guide-pulleys 6, and made fast on the other end to a drum, 7. This drum is suspended in collars secured to the under side of the platform on a shaft, 8, that carries a ratchet-wheel, 9, on one end and a cog-wheel, 10, on the other. A suitably-placed pawl rests on the ratchet-wheel and prevents the drum from turning in one direction, while the cog-wheel gears with a pinion, 11, fastened on a clutch-sleeve, 12, on the shaft K. This shaft, supported on bearings $k\ k'\ k''$, extends the width of the platform, and carries a bevel-pinion, 13, near one end. A tubular standard passes through and is fastened to the platform over the shaft K. Within the tube a rod rotates, that has a hand-wheel, 14, secured on its top, while the lower end of the rod carries a bevel-pinion, 15, that gears with the bevel-pinion 13 on the shaft K. It is evident that this connection of the bevel-pinions 13 and 15 can be made at any part of the shaft most convenient for the conductor who rides upon the platform.

The shaft K carries near its center a worm, 16, that gears with the teeth of a large circular plate, J, centrally fastened to the under side of the platform, and turning freely on its pivot-fastening 17. From the opposite side of the wheel J brackets or arms are suspended a sufficient distance to let their lower ends form or carry boxes to receive the axle of the front wheel, D, that supports the forward part of the engine and boiler, and acts as the guiding-wheel for the plow. The worm 16 on the shaft K is clutched with a sleeve, 19, that moves on a feather longitudinaly on the shaft, and this sleeve has a bracket attached that passes through and moves in a slot in the platform, and the sleeve 12 has a bracket similarly situated and operated. Now, when the conductor desires to elevate the cutters he engages the pinion 11 with the gear-wheel 10 by moving the bracket on the clutch 12, so as to keep these wheels in gear, and at the same time disengages the clutch 19 from the worm 16 by the bracket attached to the clutch, and turns the miter-gears 13 and 15 by moving the hand-wheel 14, which winds the chains 4 on the drum, and raises the cutter-shaft F, and the pawl and ratchet retain the drum in the desired position.

To lower the cutter-shaft the pawl is released from the ratchet 9, and the motion of the hand-wheel reversed until the drum lets off the length of chain desired, when the ratchet is replaced and the motion of the drum arrested.

When it is desired to change the direction in which the plow is moving without altering the position of the cutter-shaft it is only necessary for the conductor to throw the worm-clutch 19 into rigid connection and disengage the pinion 11 from its coupling with gear 10. Then on turning the hand-wheel 14 the worm will turn the plate J on its pivot, and necessarily change the line of movement of the steering or guide wheel D. Thus it will be seen that the conductor can with ease and at pleasure regulate the depth of plowing and change the direction of the line of movement of the plow to pass around obstacles or conform to the lines of the field to be cultivated.

It is obvious that many modifications in the details in construction may be adopted without departing from the spirit of my invention—as, for example, the cutter-shaft may be driven by gearing, the shafting, instead of being continuous, may be connected by couplings, and the position of other parts may be changed as convenience may require.

I do not limit myself to the use of steam-power alone as a motor for my plow and its carriage, for it is manifest that in many positions and under differing circumstances the carriage may be advantageously drawn by animal-power, while the plowing mechanism is operated by a light engine borne by the carriage.

What I do claim as my invention, and desire to secure by Letters Patent, is—

1. A series of cutters fixed on and rotating with a shaft, so as to cut the earth from the bottom of the furrow toward the surface, carry the earth taken up at each cut over the cutters, and deposit it in a reversed position or turned over behind the cutters, substantially in the manner described.

2. The combination of cleaners with the cutter when the cleaners are hinged near the edge of the cutters and forced over their concave surfaces by adjustable guides, substantially as and for the purpose described.

3. The combination of guides or rollers adjustable on the supporting-arms of the cutter-shaft with the cleaners with or without cams thereon to discharge the earth from the cutters at the point desired, substantially in the manner described.

4. The combination of the steering mechanism with the mechanism for elevating or depressing the cutter-shaft, so as to steer the carriage without changing the depth of furrow or to regulate the depth of cutting without or while changing the direction of plowing, substantially in the manner described.

In testimony whereof I have hereunto subscribed my name.

JAMES CURTIS.

Witnesses:
J. SNOWDEN BELL,
EDM. F. BROWN.